(12) United States Patent
Dai et al.

(10) Patent No.: US 9,479,254 B2
(45) Date of Patent: Oct. 25, 2016

(54) DISTRIBUTED BASE STATION SIGNAL TRANSMISSION SYSTEM AND COMMUNICATION SYSTEM

(71) Applicant: Huawei Technologies Co., Ltd., Shenzhen, Guangdong (CN)

(72) Inventors: Xiquan Dai, Shenzhen (CN); Zhenghua Fu, Yokohama (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 14/496,777

(22) Filed: Sep. 25, 2014

(65) Prior Publication Data

US 2015/0010024 A1    Jan. 8, 2015

Related U.S. Application Data

(63) Continuation of application No. PCT/CN2013/070270, filed on Jan. 9, 2013.

(30) Foreign Application Priority Data

Jun. 1, 2012   (CN) .......................... 2012 1 0179083

(51) Int. Cl.
*H04B 10/2575*   (2013.01)
*H04B 10/25*     (2013.01)
(Continued)

(52) U.S. Cl.
CPC ........ *H04B 10/25758* (2013.01); *H04B 10/25* (2013.01); *H04B 10/25752* (2013.01);
(Continued)

(58) Field of Classification Search
CPC ............ H04B 10/25; H04B 10/25752; H04B 10/25758; H04B 10/27; H04J 14/02; H04J 14/0246; H04J 14/025; H04J 14/0279; H04J 14/0282; H04J 2014/0253
USPC ....................................................... 370/535
See application file for complete search history.

(56) References Cited

U.S. PATENT DOCUMENTS 7,965,947 B2    6/2011  Yu et al.
9,287,987 B2 *  3/2016  Cheng .................. H04B 10/501
(Continued)

FOREIGN PATENT DOCUMENTS

CN    101043287 A    9/2007
CN    101841748 A    9/2010
(Continued)

OTHER PUBLICATIONS

Dong Jae Shin, et al., "Low-Cost WDM-PON With Colorless Bidirectional Transceivers", Journal of Lightwave Technology, vol. 24, No. 1, Jan. 2006, p. 158-165.

(Continued)

*Primary Examiner* — Afsar M Qureshi

(57) ABSTRACT

A distributed base station signal transmission system is provided. The system includes a first multiplexing and demultiplexing unit, which is configured to multiplex a downlink signal emitted by the base band unit and output the downlink signal to the remote radio unit, a second multiplexing and demultiplexing unit, which is configured to multiplex an uplink signal emitted by the remote radio unit and output the uplink signal to the base band unit; a first colorless optical module receives and parse the uplink signal and generate the downlink signal; and a second colorless optical module is configured to receive and parse the downlink signal and generate the uplink signal. The present invention requires only one or a pair of fibers to implement interconnection between BBUs and RRUs, and does not need to use a large number of fibers and a metro wavelength division multiplexing network.

20 Claims, 10 Drawing Sheets

(51) Int. Cl.
*H04J 14/02* (2006.01)
*H04B 10/27* (2013.01)

(52) U.S. Cl.
CPC ............... *H04B10/27* (2013.01); *H04J 14/02* (2013.01); *H04J 14/025* (2013.01); *H04J 14/0246* (2013.01); *H04J 14/0279* (2013.01); *H04J 14/0282* (2013.01); *H04J 2014/0253* (2013.01)

(56) References Cited

U.S. PATENT DOCUMENTS

| | | | |
|---|---|---|---|
| 2003/0027597 A1* | 2/2003 | LaGrotta | H04B 10/1125 455/561 |
| 2009/0220230 A1 | 9/2009 | Kim et al. | |
| 2010/0092175 A1 | 4/2010 | Kim et al. | |
| 2010/0111533 A1 | 5/2010 | Beckett et al. | |
| 2011/0033187 A1 | 2/2011 | Rossetti et al. | |
| 2011/0116808 A1 | 5/2011 | Talli et al. | |
| 2011/0188859 A1 | 8/2011 | Wen et al. | |
| 2012/0045211 A1* | 2/2012 | Tan | H04B 10/25759 398/66 |
| 2012/0106963 A1* | 5/2012 | Huang | H04Q 11/0067 398/66 |
| 2012/0269509 A1* | 10/2012 | Hultermans | H04B 10/25756 398/43 |
| 2014/0226576 A1* | 8/2014 | Gupta | H04W 56/00 370/329 |
| 2014/0226736 A1* | 8/2014 | Niu | H04L 27/2628 375/260 |
| 2014/0241315 A1* | 8/2014 | Niu | H04L 67/1091 370/331 |

FOREIGN PATENT DOCUMENTS

| | | |
|---|---|---|
| CN | 102065343 A | 5/2011 |
| CN | 102082610 A | 6/2011 |
| CN | 102412905 A | 4/2012 |
| CN | 102710361 A | 10/2012 |
| EP | 2 144 388 A2 | 1/2010 |
| WO | WO 2009/151355 A1 | 12/2009 |
| WO | WO 2011/018054 A1 | 2/2011 |

OTHER PUBLICATIONS

Yukio Horiuchi, et al., "Infrastructure and Challenges for Convergence of Radio, Fibre and DSL Technologies", 33rd European Conference and Exhibition on Optical Communication, Sep. 16-20, 2007, 4 pages.

* cited by examiner

DISTRIBUTED BASE STATION SIGNAL TRANSMISSION SYSTEM AND COMMUNICATION SYSTEM

CROSS-REFERENCE TO RELATED APPLICATIONS

This application is a continuation of International Application No. PCT/CN2013/070270, filed on Jan. 9, 2013, which claims priority to Chinese Patent Application No. 201210179083.6, filed on Jun. 1, 2012, both of which are hereby incorporated by reference in their entireties.

TECHNICAL FIELD

The present invention relates to the field of communications, and in particular, to a distributed base station signal transmission system and a communication system.

BACKGROUND

A distributed base station, compared with a conventional macro base station, is divided into a Base Band Unit (BBU) and a Remote Radio Unit (RRU). For ease of management of BBUs and flexible configuration of resources in a radio network, network operators and equipment vendors in the industry propose a network architecture that implements centralized management of BBUs. In this case, how to implement optical interconnection between BBUs and RRUs becomes a key technology. In the prior art, two methods are mainly used to implement the optical interconnection between BBUs and RRUs.

A first method is using fibers for connection, that is, using fibers to directly connect BBUs and RRUs, and a network structure thereof is illustrated in FIG. 1. In the method, the network structure is simple, but many fiber resources need to be occupied. Therefore, the method is inapplicable to a scenario where fiber resources are insufficient, and features a high cost.

A second method is using a metro wavelength division multiplexing (WDM) network for bearing, that is, using a metro wavelength division multiplexing network to bear a Common Public Radio Interface (CPRI) service between BBUs and RRUs, and a network structure thereof is illustrated in FIG. 2. The method uses an existing metro wavelength division multiplexing device to bear services, features high reliability, and is flexible in networking and service upgrade. However, the method requires that the wavelength division multiplexing device is placed in a dedicated outdoor cabinet or a wavelength division multiplexing device suitable for an outdoor scenario is developed separately, and features a high cost in networking. Therefore, a problem of large resource consumption and high costs in interconnection between BBUs and RRUs exists in the prior art.

SUMMARY

An objective of embodiments of the present invention is to provide a distributed base station signal transmission system, in order to solve a problem of large resource consumption and high costs in interconnection between BBUs and RRUs in the prior art.

The embodiments of the present invention are implemented as follows: A distributed base station signal transmission system includes a base band unit and a remote radio unit, and further includes:

a first multiplexing and demultiplexing unit, configured to multiplex a downlink signal emitted by the base band unit and output the downlink signal to the remote radio unit, and demultiplex an uplink signal sent by the remote radio unit and output the uplink signal to the base band unit;

a second multiplexing and demultiplexing unit, configured to multiplex an uplink signal emitted by the remote radio unit and output the uplink signal to the base band unit, and demultiplex a downlink signal sent by the base band unit and output the downlink signal to the remote radio unit;

a first colorless optical module, configured to receive and parse the uplink signal demultiplexed and output by the first multiplexing and demultiplexing unit and output the uplink signal to the base band unit, and generate, under modulation of the base band unit, the downlink signal and output the downlink signal to the first multiplexing and demultiplexing unit;

a second colorless optical module, configured to receive and parse the downlink signal demultiplexed and output by the second multiplexing and demultiplexing unit and output the downlink signal to the remote radio unit, and generate, under modulation of the remote radio unit, the uplink signal and output the uplink signal to the second multiplexing and demultiplexing unit;

a first broad-spectrum light source, configured to output a broad-spectrum optical signal to the first multiplexing and demultiplexing unit, and provide exciting light for the first colorless optical module, so as to generate the downlink signal; and a second broad-spectrum light source, configured to output a broad-spectrum optical signal to the second multiplexing and demultiplexing unit, and provide exciting light for the second colorless optical module, so as to generate the uplink signal.

Another objective of the embodiments of the present invention is to provide a distributed base station signal transmission system, including a base band unit and a remote radio unit, and further including:

a first multiplexing and demultiplexing unit, configured to multiplex a downlink signal emitted by the base band unit and output the downlink signal to the remote radio unit, and demultiplex an uplink signal sent by the remote radio unit and output the uplink signal to the base band unit;

a second multiplexing and demultiplexing unit, configured to multiplex an uplink signal emitted by the remote radio unit and output the uplink signal to the base band unit, and demultiplex a downlink signal sent by the base band unit and output the downlink signal to the remote radio unit;

a first colorless optical module, configured to receive and parse the uplink signal demultiplexed and output by the first multiplexing and demultiplexing unit and output the uplink signal to the base band unit, and generate, under modulation of the base band unit, the downlink signal and output the downlink signal to the first multiplexing and demultiplexing unit;

a second colorless optical module, configured to receive and parse the downlink signal demultiplexed and output by the second multiplexing and demultiplexing unit and output the downlink signal to the remote radio unit, and generate, under modulation of the remote radio unit, the uplink signal and output the uplink signal to the second multiplexing and demultiplexing unit;

a first partial reflector, configured to perform partial reflection on the downlink signal multiplexed and output by the first multiplexing and demultiplexing unit, so as to form a reverse self-injected optical signal to inject into the first colorless optical module for generating a downlink signal again; and a second partial reflector, configured to perform partial reflection on the uplink signal multiplexed and output by the second multiplexing and demultiplexing unit, so as to form a reverse self-injected optical signal to inject into the second colorless optical module for generating an uplink signal again.

In the embodiments of the present invention, a first multiplexing and demultiplexing unit and a second multiplexing and demultiplexing unit respectively multiplex signals transmitted by a BBU and an RRU, and output the signals to each other, uplink and downlink multiplexed signals are transmitted between the first multiplexing and demultiplexing unit and the second multiplexing and demultiplexing unit, where the uplink and downlink multiplexed signals each require one fiber for transmission, and the uplink and downlink multiplexed signals may also be transmitted in a same fiber. Therefore, in the embodiments of the present invention, only one trunk fiber or a pair of trunk fibers is required, and it is unnecessary to use a large number of fibers to interconnect BBUs and RRUs one by one, and unnecessary to use an expensive metro wavelength division multiplexing network for bearing services. The embodiments are applicable to a scenario where fiber resources are insufficient, facilitate network construction, and significantly save costs. In addition, in the embodiments of the present invention, a colorless optical module is used to generate a downlink or uplink signal. Compared with a traditional colored optical module, a colorless optical module can provide a random wavelength, and different BBUs and RRUs may be configured with a same type of colorless optical module, which has high adaptability, is easy to install and maintain, and significantly saves a networking cost. Further, the system may be implemented based on the existing network architecture, and may reuse fiber resources in an existing passive optical transmission system to interconnect the BBUs and the RRUs, thereby significantly simplifying network construction and saving costs.

DETAILED DESCRIPTION

To make the objectives, technical solutions, and advantages of the present invention clearer, the following describes the present invention in more detail with reference to accompanying drawings and embodiments. It should be understood that the specific embodiments described herein are merely intended to explain the present invention, but not to limit the protection scope of the present invention.

The following describes specific implementation of the present invention in detail with reference to specific embodiments:

Embodiment 1

Figure 1:
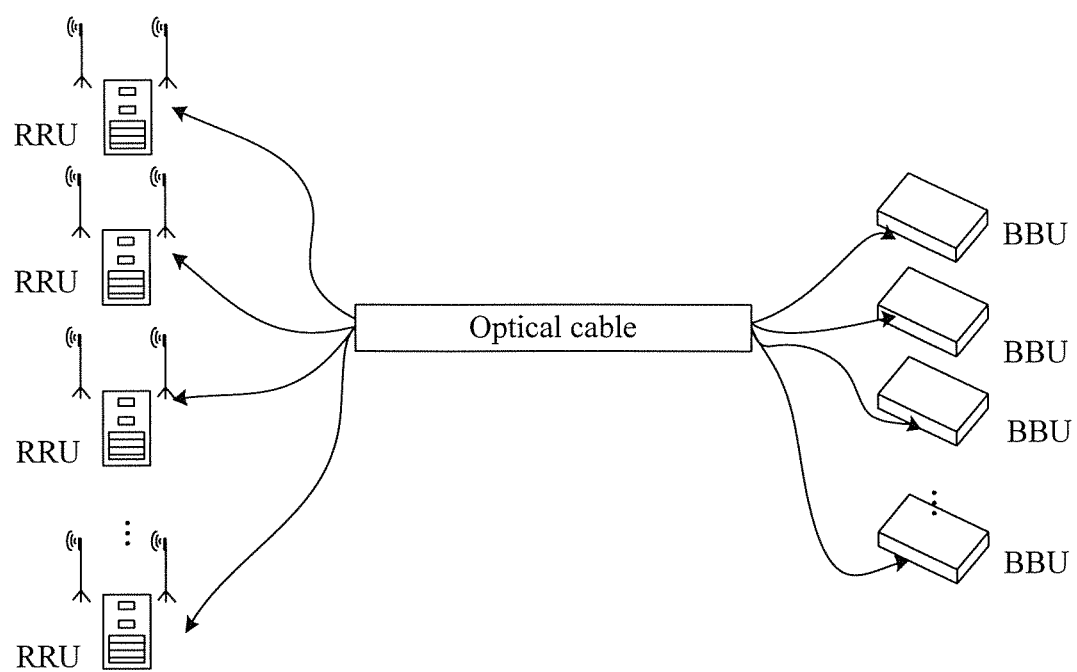
FIG. 1 is a schematic structural diagram of a system using fibers to interconnect BBUs and RRUs one by one in the prior art.
Figure 2:
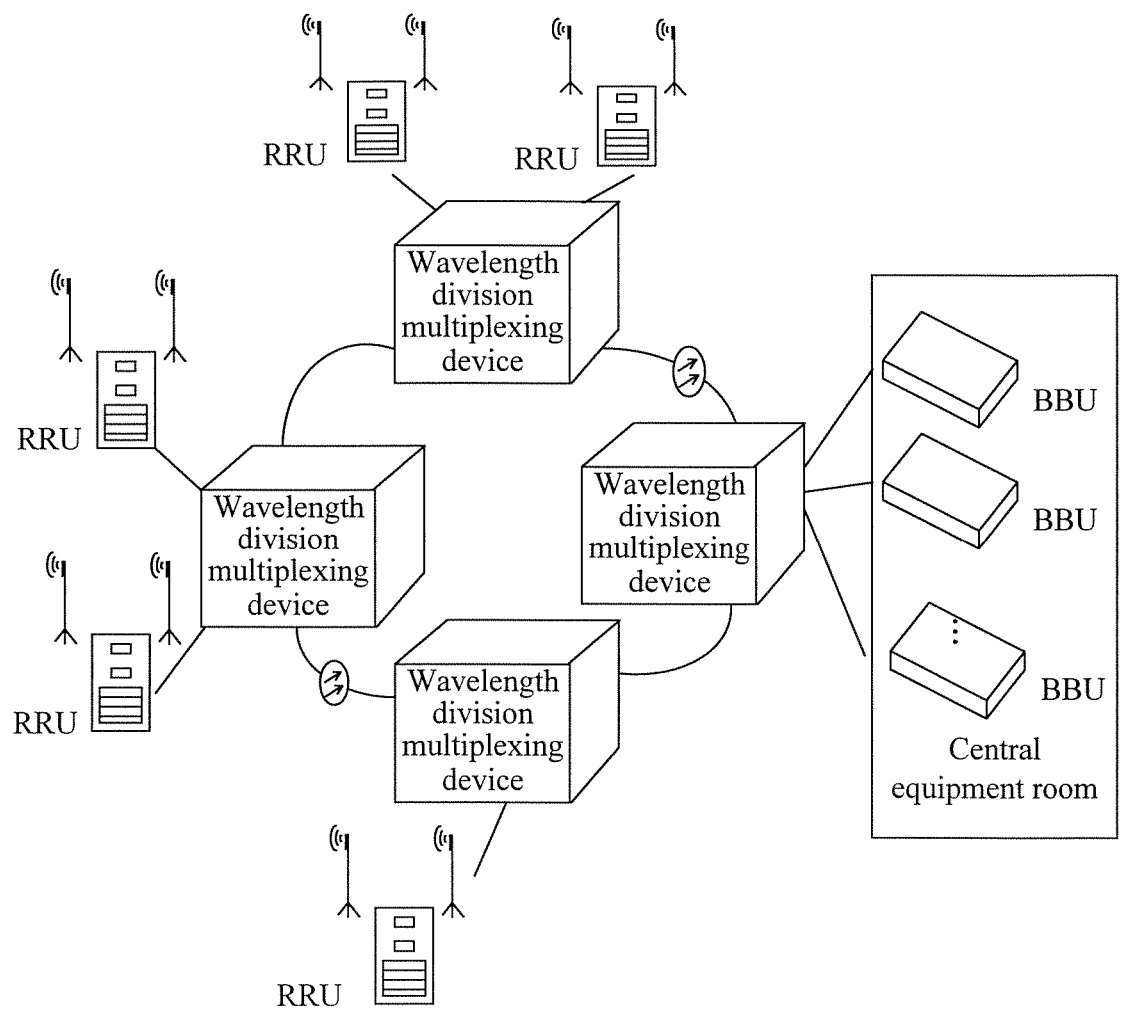
FIG. 2 is a schematic structural diagram of a system using a metro wavelength division multiplexing network to implement interconnection between BBUs and RRUs in the prior art.
Figure 3:
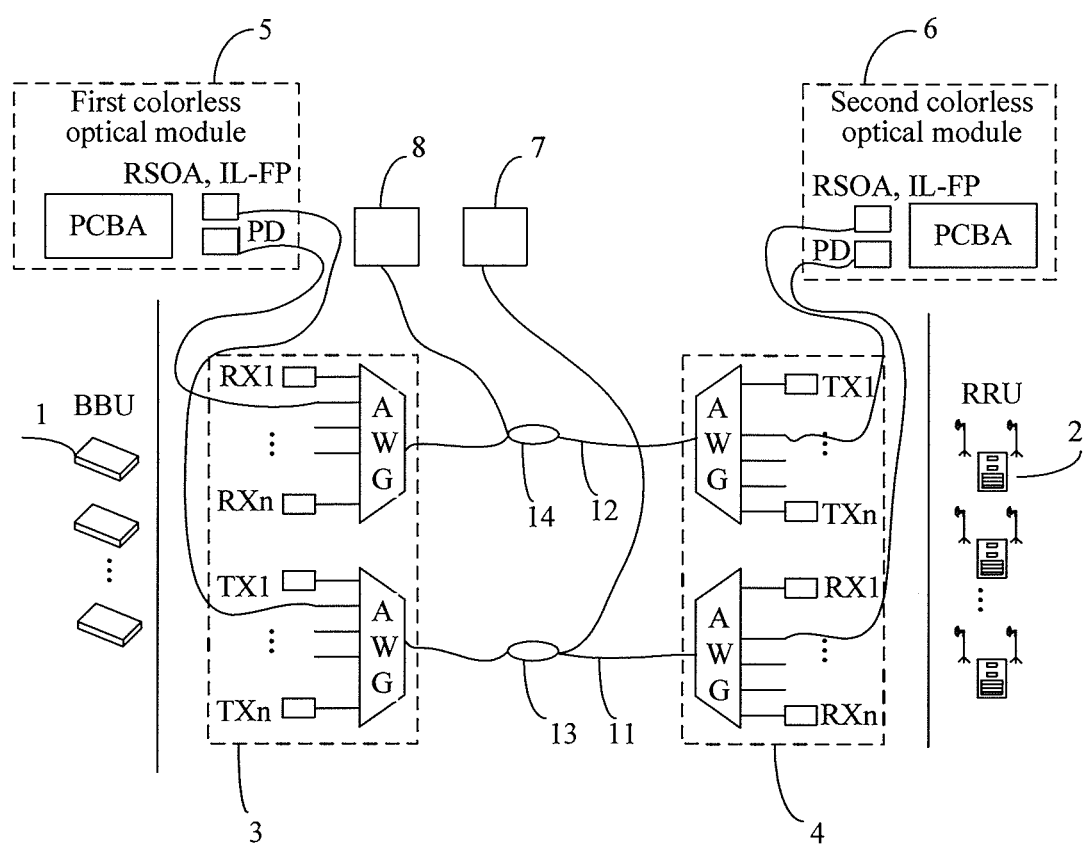
FIG. 3 is a schematic structural diagram of a distributed base station signal transmission system according to Embodiment 1 of the present invention.
Figure 4:
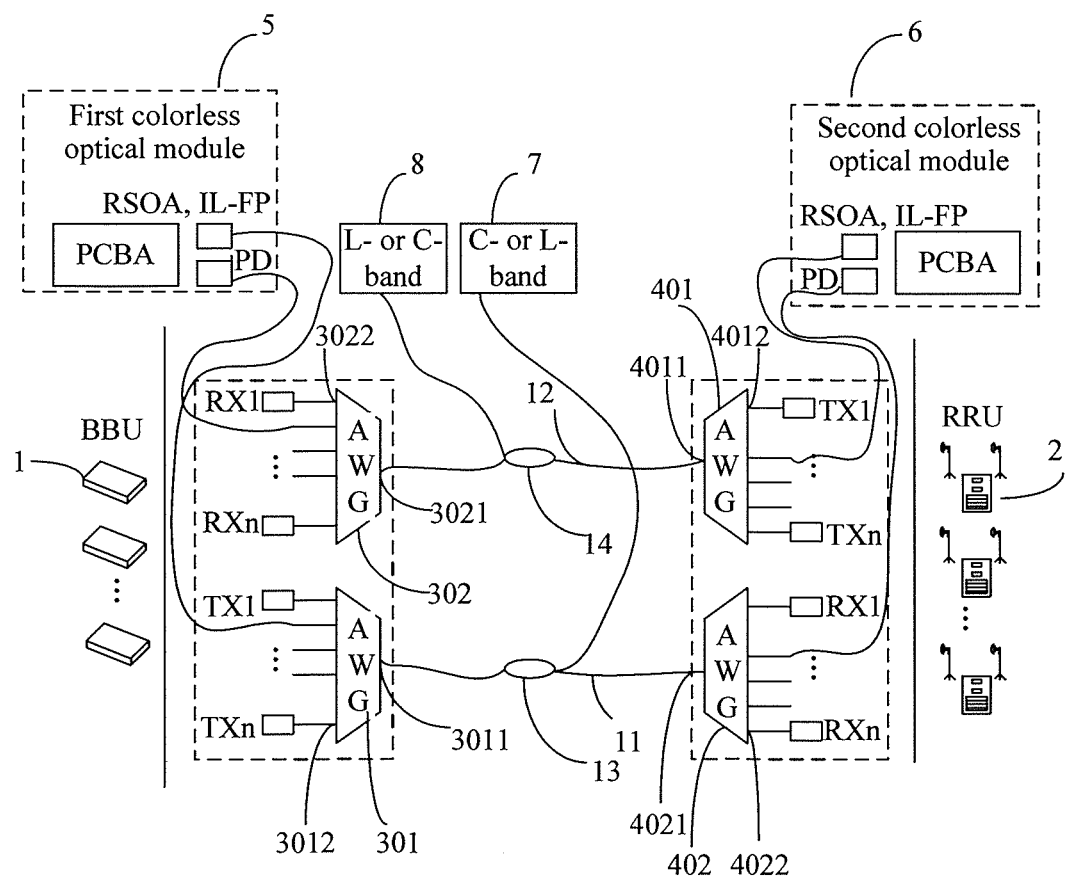
FIG. 4 is a schematic structural diagram of the distributed base station signal transmission system according to Embodiment 1 of the present invention.
Figure 5:
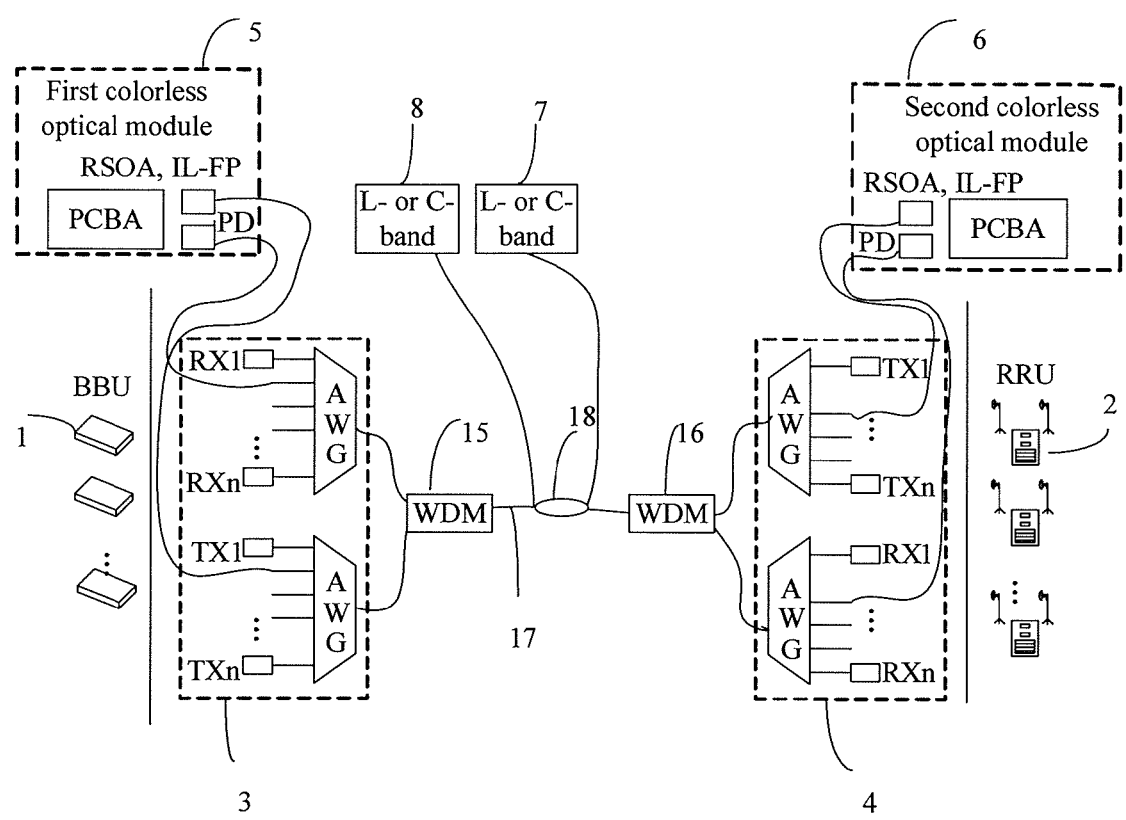
FIG. 5 is a schematic structural diagram of the distributed base station signal transmission system according to Embodiment 1 of the present invention.

FIG. 3 to FIG. 5 are schematic structural diagrams of a distributed base station signal transmission system according to Embodiment 1 of the present invention. For ease of description, only parts related to the embodiment are illustrated.

With reference to FIG. 3, the distributed base station signal transmission system includes a BBU 1 and a RRU 2, where the system further includes a first multiplexing and demultiplexing unit 3, a second multiplexing and demultiplexing unit 4, a first colorless optical module 5, a second colorless optical module 6, a first broad-spectrum light source 7, and a second broad-spectrum light source 8. The first multiplexing and demultiplexing unit 3 transmits signals with the base band unit 1 by using the first colorless optical module 5. The second multiplexing and demultiplexing unit 4 transmits signals with the RRU 2 by using the second colorless optical module 6. Multiplex signals are transmitted between the first multiplexing and demultiplexing unit 3 and the second multiplexing and demultiplexing unit 4.

The first broad-spectrum light source 7 outputs a broad-spectrum optical signal to the first multiplexing and demultiplexing unit 3, where the broad-spectrum optical signal, after being filtered by the first multiplexing and demultiplexing unit 3, is divided into a variety of monochromatic waves or a variety of narrowband light waves, so as to provide exciting light for the corresponding first colorless optical module 5. The first colorless optical module 5, under modulation of an electrical signal transmitted by the BBU 1, generates a downlink signal whose wavelength is the same as that of the exciting light. The downlink signal, after being multiplexed by the first multiplexing and demultiplexing unit 3, is output to the RRU 2. The second multiplexing and demultiplexing unit 4 at the RRU 2 side demultiplexes the multiplexed downlink signal, and the demultiplexed downlink signal, after being parsed by the second colorless optical module 6, is finally transmitted to the RRU 2, thereby completing signal transmission from the BBU 1 to the RRU 2.

Similarly, the second broad-spectrum light source 8 outputs a broad-spectrum optical signal to the second multiplexing and demultiplexing unit 4, where the broad-spectrum optical signal, after being filtered by the second multiplexing and demultiplexing unit 4, is divided into a variety of monochromatic waves or a variety of narrowband light waves, so as to provide exciting light for the corresponding second colorless optical module 6, and the second colorless optical module 6, under modulation of an electrical signal transmitted by the RRU 2, generates an uplink signal whose wavelength is the same as that of the exciting light. The uplink signal, after being multiplexed by the second multiplexing and demultiplexing unit 4, is output to the BBU 1, the first multiplexing and demultiplexing unit 3 at the BBU 1 side demultiplexes the multiplexed uplink signal, and the demultiplexed uplink signal, after being parsed by the first colorless optical module 5, is finally transmitted to the BBU 1, thereby completing signal transmission from the RRU 2 to the BBU 1. In this way, interconnection between the BBU 1 and the RRU 2 is implemented.

In the embodiment of the present invention, a first multiplexing and demultiplexing unit 3 and a second multiplexing and demultiplexing unit 4 respectively multiplex signals transmitted by a BBU 1 and an RRU 2 which are respectively connected to the first multiplexing and demultiplexing unit 3 and the second multiplexing and demultiplexing unit 4, and output the signals to each other, uplink and downlink multiplexed signals are transmitted between the first multiplexing and demultiplexing unit 3 and the second multiplexing and demultiplexing unit 4, where the uplink and downlink multiplexed signals each require one fiber for transmission, and the uplink and downlink multiplexed signals may even be transmitted in a same fiber. Therefore, in the embodiment of the present invention, it is unnecessary to use a large number of fibers to interconnect BBUs 1 and RRUs 2 one by one, and unnecessary to use an expensive metro wavelength division multiplexing network for bearing services. The embodiment is not only applicable to a scenario where fiber resources are insufficient, but also facilitates network construction and significantly saves costs. Further, the system may be implemented based on an existing network architecture, and may use fiber resources in an existing passive optical network (and an existing multiplexing and demultiplexing device) to transmit an uplink or downlink signal, thereby further simplifying network construction and saving costs. In addition, in the embodiment of the present invention, an optical signal is injected by an external broad-spectrum light source; a first colorless optical module and a second colorless optical module are used to generate a downlink signal and an uplink signal. Compared with a conventional colored optical module, a colorless optical module may provide a signal of a random wavelength, and no matter which service band is used by the BBU and RRU, a same type of colorless optical module may be configured, which has high adaptability, is easy to install and maintain, and significantly saves a networking cost.

In the embodiment, the first colorless optical module 5 may be embedded in the BBU 1, and the second colorless optical module 6 may be embedded in the RRU 2.

In the embodiment of the present invention, the uplink signal and the downlink signal use different bands, and may respectively use L-band (1570.42 nm to 1603.57 nm or 190.90 THz to 186.95 THz) and C-band (1529.16 nm to 1560.61 nm or 196.05 THz to 192.10 THz), or respectively use two different sub-bands of L-band or C-band. In practical networking, types of the first and second multiplexing and demultiplexing units and specific composition structures thereof may be determined according to the specific bands which are used by the uplink signal and the downlink signal.

Generally, a multiplexing and demultiplexing device can implement wavelength division multiplexing for a certain bandwidth, for example, L-band or C-band, but cannot implement multiplexing for a band whose bandwidth is too broad, for example, a relatively broad band including L-band and C-band. Therefore, when the uplink signal and the downlink signal use two different sub-bands of L-band or C-band, the first multiplexing and demultiplexing unit 3 and the second multiplexing and demultiplexing unit 4 may be formed by one multiplexing and demultiplexing device each; when the uplink signal and the downlink signal respectively use L-band and C-band, the first and second multiplexing and demultiplexing units may preferably be formed by two multiplexing and demultiplexing devices each, in order to satisfy a service requirement of a relatively broad band.

Further with reference to FIG. 4, preferably, in the embodiment of the present invention, the uplink signal and the downlink signal respectively use L-band and C-band, which have relatively large capacities, facilitates signal transmission, and facilitates configuration of a broad-spectrum light source. In this case, the first multiplexing and demultiplexing unit 3 may be formed by two multiplexing and demultiplexing devices, where one of the two devices is a first transmitting end device 301, which may multiplex and output a C-band downlink signal, and the other is a first receiving end device 302, which may receive and demultiplex an L-band uplink signal. The first transmitting end device 301 has a first common port 3011, and the first receiving end device 302 has a second common port 3021. The first transmitting end device 301 outputs the multiplexed downlink signal through the first common port 3011, and the first receiving end device 302 receives the multiplexed uplink signal through the second common port 3021. Similarly, the second multiplexing and demultiplexing unit 4 is formed by two multiplexing and demultiplexing devices, where one of the two devices is a second transmitting end device 401, which may multiplex and output an L-band uplink signal, and the other is a second receiving end device 402, which may receive and demultiplex a C-band downlink signal. The second transmitting end device 401 has a third common port 4011, and the second receiving end device 402 has a fourth common port 4021. The second transmitting end device 401 outputs the multiplexed uplink signal through the third common port 4011, and the second receiving end device 402 receives the multiplexed downlink signal through the fourth common port 4021.

Further, the first multiplexing and demultiplexing unit 3 also includes multiple branch ports.

Specifically, the first transmitting end device 301 has multiple first branch ports 3012, which are correspondingly connected to multiple first colorless optical modules 5 in a one-to-one manner, and further downlink signals generated by the first colorless optical modules 5 may be transmitted to the first transmitting end device 301, multiplexed by the first transmitting end device 301, and output through the first common port 3011, thereby implementing multiplexing and outputting of the downlink signals.

Further, the first receiving end device 302 has multiple second branch ports 3022, which are correspondingly connected to multiple first colorless optical modules 5 in a one-to-one manner, and uplink signals demultiplexed by the first receiving end device 302 are transmitted to the corresponding first colorless optical modules 5, thereby implementing receiving and parsing of the uplink signals.

Likewise, the second multiplexing and demultiplexing unit 4 also includes multiple branch ports.

Specifically, the second transmitting end device 401 has multiple third branch ports 4012, and the second receiving end device 402 has multiple fourth branch ports 4022, which are all correspondingly connected to the second colorless optical modules 6 in a one-to-one manner. Uplink signals generated by the second colorless optical modules 6 may be transmitted to the second transmitting end device 401 through the corresponding third branch ports 4012, multiplexed by the second transmitting end device 401, and output through the third common port 4011, thereby implementing multiplexing and outputting of the uplink signals. The second receiving end device 402 demultiplexes multiplexed downlink signals, and the downlink signals are transmitted to the corresponding second colorless optical modules 6 through the fourth branch ports 4022, thereby implementing receiving and parsing of the downlink signals.

It may be understood that an uplink signal may also use C-band, and that a downlink signal may use L-band. Certainly, the uplink signal and the downlink signal may also use other bands, which is not strictly limited. In practical networking, it is appropriate to choose multiplexing and demultiplexing units reasonably according to specific bands.

In the embodiment of the present invention, when both the first multiplexing and demultiplexing unit 3 and the second multiplexing and demultiplexing unit 4 are formed by two multiplexing and demultiplexing devices, the first common port 3011 of the first transmitting end device 301 is connected to the fourth common port 4021 of the second receiving end device 402 through a first fiber 11, to provide a transmission path for the downlink signal. Similarly, the second common port 3021 of the first receiving end device 302 is connected to the third common port 4011 of the second transmitting end device 401 through a second fiber 12, to provide a transmission path for the uplink signal. Therefore, only two trunk fibers need to be disposed in the system.

Further, a coupler may be disposed on the first fiber 11 and the second fiber 12 each. The couplers are respectively a first coupler 13 and a second coupler 14. The first broad-spectrum light source 7 outputs a broad-spectrum optical signal to the first common port 3011 through the first coupler 13, and the first transmitting end device 301 demultiplexes the broad-spectrum optical signal and outputs the broad-spectrum optical signal to each of the first colorless optical modules 5, to provide exciting light for the first colorless optical module 5, so as to generate a downlink signal. The second broad-spectrum light source 8 outputs a broad-spectrum optical signal to the third common port 4011 through the second coupler 14, and the second transmitting end device 401 decomposes the broad-spectrum optical signal to each of the second colorless optical modules 6, so as to generate an uplink signal.

Figure 6:
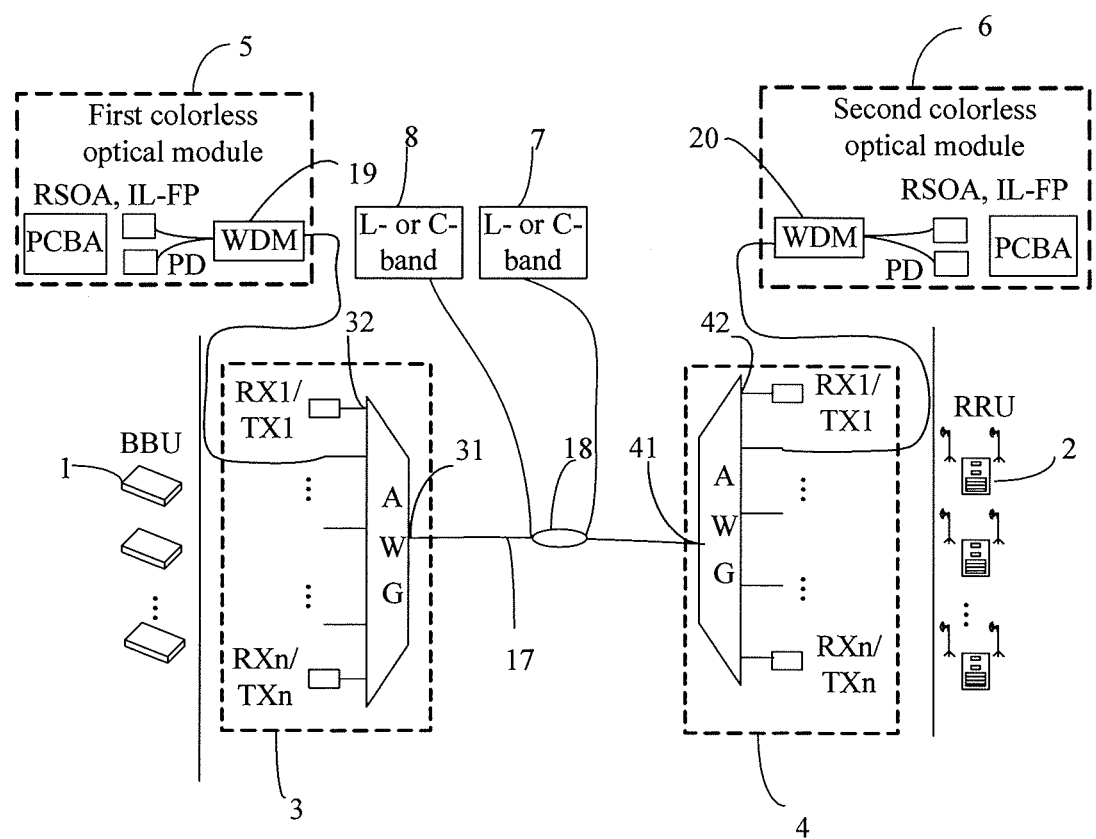
FIG. 6 is a schematic structural diagram of a distributed base station signal transmission system according to Embodiment 2 of the present invention.
Figure 7:
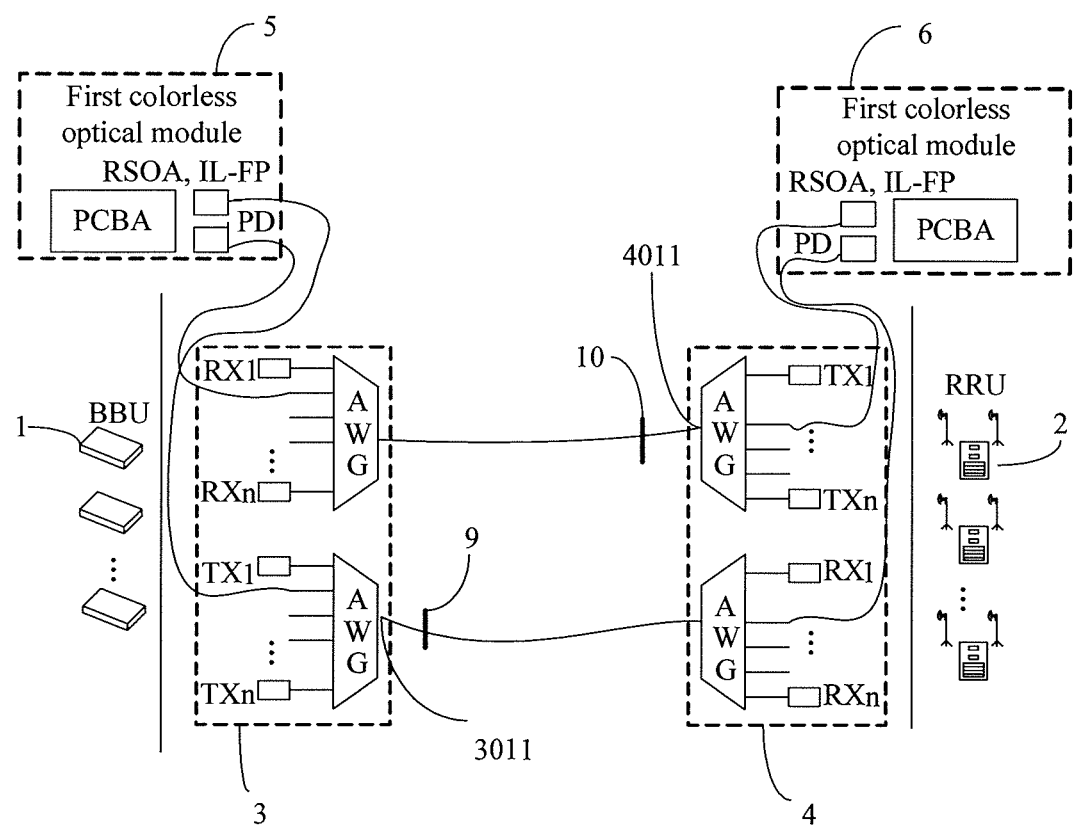
FIG. 7 is a schematic structural diagram of a distributed base station signal transmission system according to Embodiment 3 of the present invention.

With reference to FIG. 6 and FIG. 7, as a further improvement of the embodiment of the present invention, two WDMs may be added to the system, where both the first common port 3011 and the second common port 3021 are connected to a first wavelength division multiplexer 15, both the third common port 4011 and the fourth common port 4021 are connected to a second wavelength division multiplexer 16, and the first wavelength division multiplexer 15 and the second wavelength division multiplexer 16 are connected by using a single fiber 17. By using the first wavelength division multiplexer 15 and the second wavelength division multiplexer 16, an uplink signal band (for example, L-band) and a downlink signal band (for example, C-band) may be multiplexed or demultiplexed, so that the uplink signal band and the downlink signal band can be transmitted in the single fiber 17. In this case, only one trunk fiber needs to be configured in the system. This solution is particularly applicable to a scenario where fiber resources are insufficient.

Further, when WDMs are disposed in the system, the first broad-spectrum light source 7 and the second broad-spectrum light source 8 may output a broad-spectrum optical signal respectively to the first common port 3011 and the third common port 4011 through a same third coupler 18, where the third coupler 18 is disposed on the single fiber 17. Compared with the solution which uses two fibers, after the WDMs are used, not only fibers are saved, but also the number of used couplers decreases, and further costs are reduced.

In the embodiment, both the first multiplexing and demultiplexing unit 3 and the second multiplexing and demultiplexing unit 4 may use an Array Waveguide Grating (AWG) or an Optical Add-Drop Multiplexer (OADM) formed by optical filters.

In the embodiment, both the first colorless optical module 5 and the second colorless optical module 6 include a signal transmitter and a signal receiver, where a Photo Diode (PD) is disposed in the signal receiver. A light-emitting medium in the signal transmitter may spontaneously radiate, or may generate an optical signal under an action of exciting light. Specifically, the signal transmitter may use a reflective semi-conductor optical amplifier (RSOA), or may use an injection-locked Fabry-Perot laser (IL-FP) and the like. After the signal transmitter performs modulation by using electrical data from the BBU 1 side, a corresponding downlink signal is generated. The signal receiver in the second colorless optical module 6 of the RRU 2 side parses the downlink signal, and restores data that is carried in the downlink signal, thereby completing data transmission from the BBU 1 to the RRU 2. Data transmission from the RRU 2 to the BBU 1 is the same as above.

Embodiment 2

FIG. 6 is a schematic structural diagram of a distributed base station signal transmission system according to Embodiment 2 of the present invention. For ease of description, only parts related to the embodiment are illustrated.

The embodiment of the present invention is a corresponding technical improvement performed on the foregoing Embodiment 1. A multiplexing and demultiplexing unit 3 in this embodiment may use a cyclic multiplexing and demultiplexing device, which specifically may be a cyclic AWG. The cyclic AWG device may input and output both light of C-band and L-band (respectively an uplink band and a downlink band) at a same port. Therefore, by using only one AWG device, transmission of uplink and downlink signals can be implemented through one port, thereby decreasing the number of multiplexing and demultiplexing devices and further saving costs.

Specifically with reference to FIG. 6, a first multiplexing and demultiplexing unit only includes one common port. In order to distinguish from the common ports in the foregoing embodiment, it is named a fifth common port 31 in this embodiment, where the fifth common port 31 is mainly configured to output a downlink signal multiplexed by a first multiplexing and demultiplexing unit 3 and receive an uplink signal multiplexed and output by a second multiplexing and demultiplexing unit 4. Likewise, the second multiplexing and demultiplexing unit 4 includes a sixth common port 41, which outputs an uplink signal multiplexed by the second multiplexing and demultiplexing unit 4 and receive a downlink signal multiplexed and output by the first multiplexing and demultiplexing unit 3. The fifth common port 31 and the sixth common port 41 are still connected by using a single fiber 17.

Likewise, a first broad-spectrum light source 7 and a second broad-spectrum light source 8 still output a broad-spectrum optical signal respectively to the fifth common port 31 and the sixth common port 41 through a same third coupler 18, and the broad-spectrum optical signal is output to a corresponding colorless optical module through the multiplexing and demultiplexing unit.

Further, the first multiplexing and demultiplexing unit 3 also has several branch ports that may perform input and output at the same time, for example, C1-band and L1-band signals are transmitted upward and downward respectively through one branch port, C2-band and L2-band signals are transmitted upward and downward respectively through another branch port, and so on. Specifically, the first multiplexing and demultiplexing unit 3 in the embodiment further includes fifth branch ports 32, which are correspondingly connected to first colorless optical modules 5 in a one-to-one manner, and transmit downlink signals generated by the first colorless optical modules 5 to the first multiplexing and demultiplexing unit 3 and transmit uplink signals demultiplexed by the first multiplexing and demultiplexing unit 3 to the corresponding first colorless optical modules 5. Similarly, the second multiplexing and demultiplexing unit 4 further includes sixth branch ports 42, which are correspondingly connected to second colorless optical modules 6 in a one-to-one manner, and configured to transmit uplink signals generated by the second colorless optical modules 6 to the second multiplexing and demultiplexing unit 4 and transmit downlink signals demultiplexed by the second multiplexing and demultiplexing unit 4 to the corresponding second colorless optical modules 6.

Based on the foregoing improvement, a wavelength division multiplexer is disposed in the first colorless optical module 5 and the second colorless optical module 6 each. The wavelength division multiplexers are respectively a third wavelength division multiplexer 19 and a fourth wavelength division multiplexer 20, where one end of the third wavelength division multiplexer 19 is connected to a corresponding fifth branch port 32, and the other end is connected to a signal transmitter and a signal receiver in the first colorless optical module 5, and the third wavelength division multiplexer 19 is configured to combine or divide uplink and downlink signals. Similarly, one end of the fourth wavelength division multiplexer 20 is connected to a corresponding sixth branch port 42, and the other end is connected to a signal transmitter and a signal receiver in the second colorless optical module 6.

In the embodiment of the present invention, the number of multiplexing and demultiplexing devices decreases, and only one trunk fiber is required to perform transmission. Therefore, the system structure is simpler and costs are lower.

Embodiment 3

Figure 8:
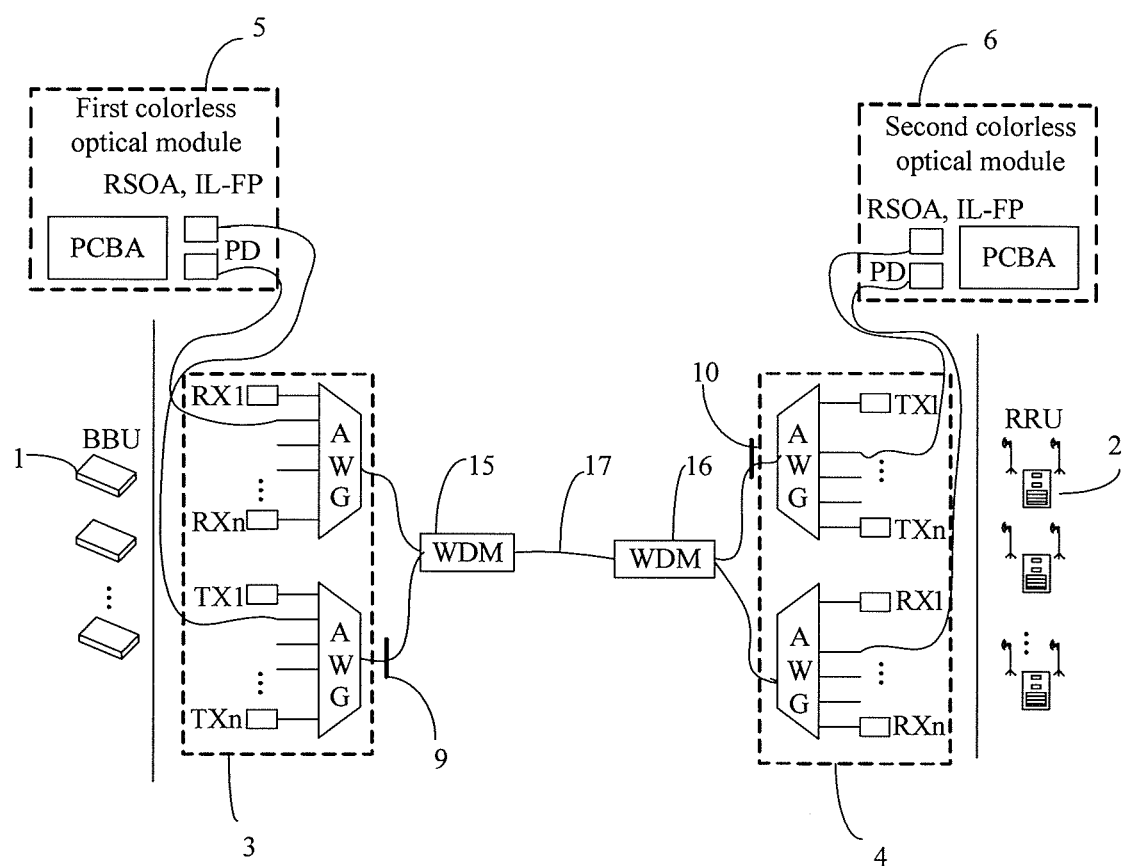
FIG. 8 is a schematic structural diagram of the distributed base station signal transmission system according to Embodiment 3 of the present invention.

FIG. 7 and FIG. 8 are schematic structural diagrams of a distributed base station signal transmission system according to Embodiment 3 of the present invention. For ease of description, only parts related to the embodiment are illustrated.

The distributed base station signal transmission system provided in the embodiment of the present invention is largely the same as the system described in the foregoing Embodiment 1. Specifically, the system provided in the embodiment of the present invention includes a BBU1 and a RRU 2, and further includes a first multiplexing and demultiplexing unit 3, a second multiplexing and demultiplexing unit 4, a first colorless optical module 5, and a second colorless optical module 6. The foregoing devices have same structures and operating principles as the corresponding devices described in Embodiment 1, and are core components of the system. Unlike Embodiment 1, the system does not use an external broad-spectrum light source to inject light into the first colorless optical module 5 and the second colorless optical module 6, but uses spontaneous radiation of the first colorless optical module 5 and the second colorless optical module 6 with reflectors to form self-injected or self-seeding light, which means that this embodiment differs from the foregoing embodiments in a source of exciting light of the first colorless optical module 5 and the second colorless optical module 6.

Specifically, the system may connect an end where the first multiplexing and demultiplexing unit 3 outputs a multiplexed signal, to a first partial reflector 9, and connect an end where the second multiplexing and demultiplexing unit 4 outputs a multiplexed signal, to a second partial reflector 10. The first partial reflector 9, the first multiplexing and demultiplexing unit 3, and a light-emitting medium in the first colorless optical module 5 form an external cavity laser, where the first colorless optical module 5 spontaneously radiates to emit white light. After the white light is filtered by the first multiplexing and demultiplexing unit 3, a required monochrome or narrow-band light wave is output, and the light wave is reflected by the first partial reflector 9 to form a reverse self-injected optical signal. The optical signal is passed back by the first multiplexing and demultiplexing unit 3 to a corresponding first colorless optical module 5, gain amplification is implemented in the first colorless optical module 5, and the first colorless optical module 5 generates, under modulation of an electrical signal transmitted by the BBU 1, a downlink signal whose wavelength is the same as that of the optical signal. After the downlink signal is output by the first multiplexing and demultiplexing unit 3, a part of the optical signal is reflected by the first partial reflector 9 again, to provide exciting light for the first colorless optical module 5 again. Repeatedly in this way, intra-cavity laser resonance is formed, so that the first colorless optical module 5 can output downlink signals continuously. Similarly, the second colorless optical module 6 outputs uplink signals under a reflection action of the second partial reflector 10 and modulation of the RRU 2.

Same as what is described in the foregoing Embodiment 1, in the embodiment of the present invention, a first multiplexing and demultiplexing unit 3 and a second multiplexing and demultiplexing unit 4 respectively multiplex signals transmitted by a BBU 1 and an RRU 2 which are respectively connected to the first multiplexing and demultiplexing unit 3 and the second multiplexing and demultiplexing unit 4, and output the signals to each other. Uplink and downlink multiplexed signals are transmitted between the first multiplexing and demultiplexing unit 3 and the second multiplexing and demultiplexing unit 4, where the uplink and downlink multiplexed signals each require one fiber for transmission, and the uplink and downlink multiplexed signals may even be transmitted in a same fiber. Therefore, in the embodiment of the present invention, it is unnecessary to use a large number of fibers to interconnect BBUs 1 and RRUs 2 one by one, and unnecessary to use an expensive metro wavelength division multiplexing network for bearing. The embodiment is not only applicable to a scenario where fiber resources are insufficient, but also facilitates network construction and significantly saves costs. Further, the system may be implemented based on an existing network architecture, and may use fiber resources in an existing passive optical network (and an existing multiplexing and demultiplexing device) to transmit an uplink or downlink signal, thereby further simplifying network construction and saving costs. In addition, the embodiment of the present invention uses a first colorless optical module and a second colorless optical module, with partial reflectors, to constantly generate downlink signals and uplink signals. Compared with a conventional colored optical module, a colorless optical module may provide a signal of a random wavelength, and no matter which service band is used by the BBU and RRU, a same type of colorless optical module may be configured, which has high adaptability, is easy to install and maintain, and significantly saves a networking cost. In addition, the embodiment of the present invention uses a partial reflector to provide a self-seeding light source. Therefore, compared with the solution using an external light source, the system structure is simpler and costs are lower.

In the embodiment of the present invention, the system may also be refined and improved as described in Embodiment 1, for example, a used band of uplink and downlink signals, types and structures of the first and second multiplexing and demultiplexing units, a connection relationship between the first and second multiplexing and demultiplexing units, and a composition structure of a colorless optical module, which are not described herein again.

Figure 9:
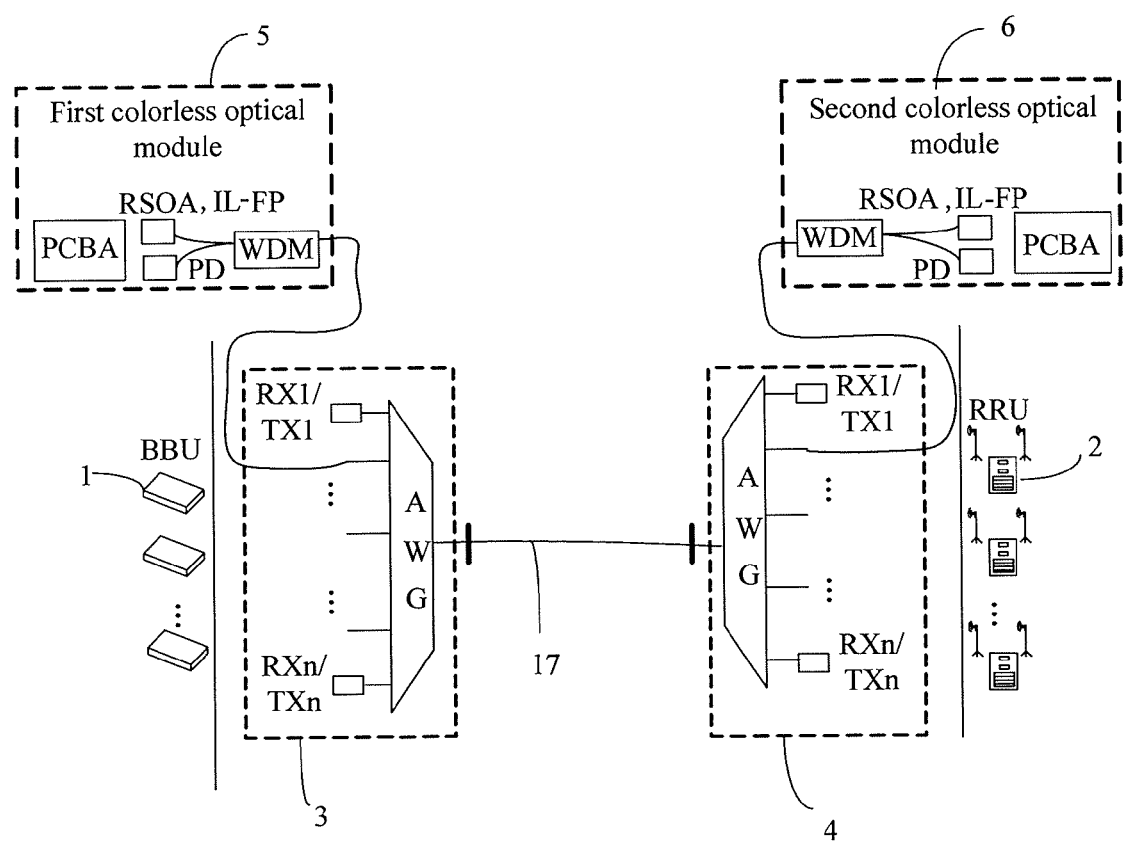
FIG. 9 is a schematic structural diagram of the distributed base station signal transmission system according to Embodiment 3 of the present invention.

Further, the present invention may provide, based on this embodiment, another improved embodiment. Similar to Embodiment 2, the multiplexing and demultiplexing unit 3 may use a cyclic multiplexing and demultiplexing device, which can implement transmission of uplink and downlink signals through one port, thereby decreasing the number of multiplexing and demultiplexing devices and further saving costs. Specifically with reference to FIG. 9, improvements of the system are similar to the foregoing Embodiment 2, and not described herein again.

The foregoing embodiments of the present invention apply a colorless wavelength division multiplexing technology to implement interconnection between BBUs and RRUs, use only one or a pair of fibers to implement interconnection between multiple BBUs and RRUs, effectively solve a problem of long-distance transmission between BBUs and RRUs, and facilitate centralized management of the BBUs; therefore, on the one hand, fiber resources are saved, and on the other hand, costs are saved significantly. In addition, the signal transmission system may be combined with an existing passive optical network (PON) to implement interconnection between the BBUs and the RRUs based on existing PON resources, thereby facilitating system construction and significantly saving costs.

Figure 10:
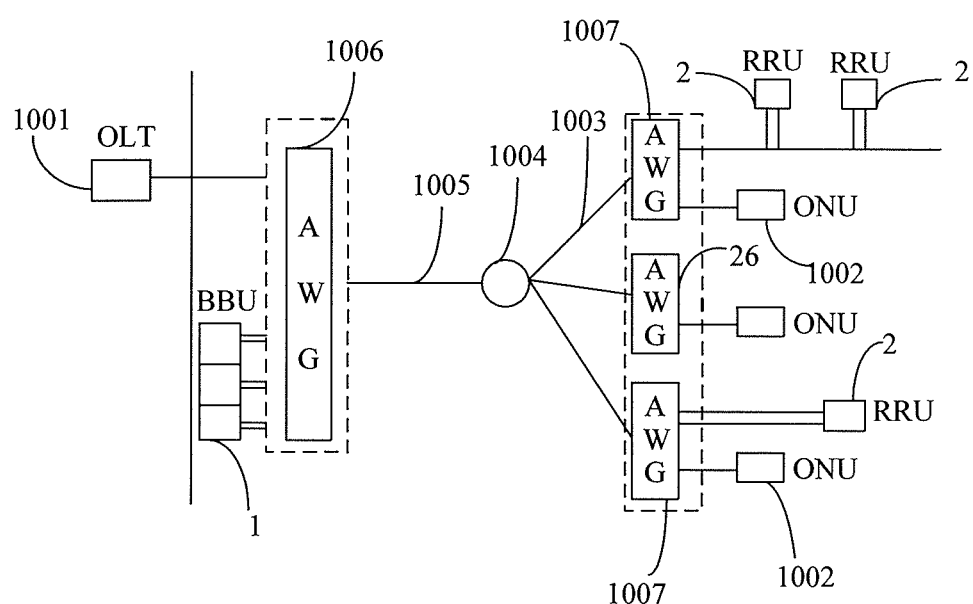
FIG. 10 is a schematic diagram of a combination of a distributed base station signal transmission system provided in embodiments of the present invention and an existing passive optical transmission system.

Reference may be made to FIG. 10, which illustrates a combination of the base station signal transmission system and an existing passive optical transmission system. Specifically, the passive optical transmission system includes a network side optical line terminal (OLT) 1001 and a user side optical network unit (ONU) 1002. Using a network structure shown in FIG. 10 as an example, each of three ONUs 1002 is connected to a branch fiber 1003, the three branch fibers 1003 are together connected to an optical splitter 1004, the optical splitter 1004 is connected to a trunk fiber 1005, and the other end of the trunk fiber 1005 is connected to the OLT 1001. Signals emitted by the OLT 1001 are transmitted to the optical splitter 1004 through the trunk fiber 1005, and the optical splitter 1004 divides the optical signals into three equal parts and separately inputs the three parts to three branch fibers 1003, to send the signals to different ONUs 1002, and the ONUs 1002 obtain, after filtering the optical signals, corresponding signals. Certainly, a first multiplexing and demultiplexing device 1006 may also be disposed at the OLT 1001 side on the passive optical network, and configured to multiplex a signal sent by the OLT 1001 and output the signal to an ONU 1002, and demultiplex a signal sent by the ONU 1002 and output the signal to the OLT 1001. A second multiplexing and demultiplexing device 1007 may be disposed at the ONU 1002 side, and configured to multiplex a signal sent by the ONU 1002 and output the signal to the OLT 1001, and demultiplex a signal sent by the OLT 1001 to the ONU 1002.

Based on the existing network architecture, RRUs 2 are distributed at the ONU 1002 side, and BBUs 1 are distributed at the OLT 1001 side. When the first and second multiplexing and demultiplexing devices are disposed in the existing passive optical transmission system, and the devices are applicable to service bands of a BBU 1 and an RRU 2, the RRU 2 and BBU 1 may be respectively connected to the existing second multiplexing and demultiplexing device 1007 and the first multiplexing and demultiplexing device 1006. Uplink signals emitted by RRUs 2 are output after being multiplexed by the second multiplexing and demultiplexing device 1007, and are transmitted to the trunk fiber 1005 through corresponding branch fibers 1003; the first multiplexing and demultiplexing device 1006 at the OLT 1001 side demultiplexes the multiplexed signals from the trunk fiber 1005, to colorless optical modules in corresponding BBUs 1. Conversely, downlink signals emitted by BBUs 1 are output, after being multiplexed by the first multiplexing and demultiplexing device 1006 at the OLT 1001 side, to the trunk fiber 1005, and are transmitted to colorless optical modules in corresponding RRUs 2 through the branch fibers 1003 and the second multiplexing and demultiplexing device 1007 at ONU 1002 side. Certainly, at the beginning of network construction (that is, when actual services are not deployed) and during actual service deployment, BBUs and RRUs can perform signal transmission based on an existing network, so long as no signal interference is caused.

It is understandable that, when multiplexing and demultiplexing devices are not configured at the OLT 1001 and ONU 1002 sides, multiplexing and demultiplexing devices may be added based on the existing fiber resources, where the multiplexing and demultiplexing devices are connected to the existing optical network, so that the BBU 1 and RRU 2 use the existing fiber resources to perform signal transmission.

It is understandable that service bands used by the BBU 1 and RRU 2 may be different from service bands of an existing passive optical transmission system; when the configured multiplexing and demultiplexing devices disposed in the existing passive optical transmission system are not applicable to bands of the BBU 1 and RRU 2, usually corresponding multiplexing and demultiplexing devices are added based on existing fiber resources (for example, the trunk fiber 1005 and the branch fibers 1003), for signal transmission between the BBU 1 and the RRU 2.

In conclusion, the base station signal transmission system may be constructed based on an existing passive optical transmission system, and reuse existing fiber resources to transmit signals, thereby implementing an effective combination between this system and the existing network, significantly saving invested material and human resources, and effectively reducing costs.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A distributed base station signal transmission system, comprising:
   a base band unit;
   a remote radio unit;
   a first multiplexing and demultiplexing unit, configured to multiplex a downlink signal emitted by the base band unit and output the downlink signal to the remote radio unit, and demultiplex an uplink signal sent by the remote radio unit and output the uplink signal to the base band unit;
   a second multiplexing and demultiplexing unit, configured to multiplex an uplink signal emitted by the remote radio unit and output the uplink signal to the base band unit, and demultiplex a downlink signal sent by the base band unit and output the downlink signal to the remote radio unit;
   a first colorless optical module, configured to receive and parse the uplink signal demultiplexed and output by the first multiplexing and demultiplexing unit and output the uplink signal to the base band unit, and generate, under modulation of the base band unit, the downlink signal and output the downlink signal to the first multiplexing and demultiplexing unit;
   a second colorless optical module, configured to receive and parse the downlink signal demultiplexed and output by the second multiplexing and demultiplexing unit and output the downlink signal to the remote radio unit, and generate, under modulation of the remote radio unit, the uplink signal and output the uplink signal to the second multiplexing and demultiplexing unit;
   a first broad-spectrum light source, configured to output a broad-spectrum optical signal to the first multiplexing and demultiplexing unit, and provide exciting light for the first colorless optical module, so as to generate the downlink signal; and
   a second broad-spectrum light source, configured to output a broad-spectrum optical signal to the second multiplexing and demultiplexing unit, and provide exciting light for the second colorless optical module, so as to generate the uplink signal.

2. The system according to claim 1, wherein:
   the first multiplexing and demultiplexing unit comprises:
      a first common port, configured to output the downlink signal multiplexed by the first multiplexing and demultiplexing unit, and
      a second common port, configured to receive the uplink signal multiplexed and output by the second multiplexing and demultiplexing unit; and
   the second multiplexing and demultiplexing unit comprises:
      a third common port, configured to output the uplink signal multiplexed by the second multiplexing and demultiplexing unit, and
      a fourth common port, configured to receive the downlink signal multiplexed and output by the first multiplexing and demultiplexing unit.

3. The system according to claim 2, wherein:
   the first multiplexing and demultiplexing unit further comprises:
      a first branch port, correspondingly connected to the first colorless optical module in a one-to-one manner, and configured to transmit the downlink signal generated by the first colorless optical module to the first multiplexing and demultiplexing unit, and
      a second branch port, correspondingly connected to the first colorless optical module in a one-to-one manner, and configured to transmit the uplink signal demultiplexed by the first multiplexing and demultiplexing unit to the corresponding first colorless optical module; and
   the second multiplexing and demultiplexing unit further comprises:
      a third branch port, correspondingly connected to the second colorless optical module in a one-to-one manner, and configured to transmit the uplink signal generated by the second colorless optical module to the second multiplexing and demultiplexing unit, and
      a fourth branch port, correspondingly connected to the second colorless optical module in a one-to-one manner, and configured to transmit the downlink signal demultiplexed by the second multiplexing and demultiplexing unit to the corresponding second colorless optical module.

4. The system according to claim 2, wherein:
   the first common port and the fourth common port are connected by using a first fiber; and
   the second common port and the third common port are connected by using a second fiber.

5. The system according to claim 4, wherein:
   a first coupler is disposed on the first fiber, and the first broad-spectrum light source outputs the broad-spectrum optical signal to the first common port through the first coupler; and
   a second coupler is disposed on the second fiber, and the second broad-spectrum light source outputs the broad-spectrum optical signal to the third common port through the second coupler.

6. The system according to claim 2, wherein:
   both the first common port and the second common port are connected to a first wavelength division multiplexer;
   both the third common port and the fourth common port are connected to a second wavelength division multiplexer; and
   the first wavelength division multiplexer and the second wavelength division multiplexer are connected by using a single fiber.

7. The system according to claim 6, wherein a third coupler is disposed on the single fiber, and the first broad-spectrum light source and the second broad-spectrum light source output the broad-spectrum optical signals respectively to the first common port and the third common port through the third coupler.

8. The system according to claim 1, wherein:
   the first multiplexing and demultiplexing unit comprises:
      a fifth common port, configured to output the downlink signal multiplexed by the first multiplexing and demultiplexing unit, and receive the uplink signal multiplexed and output by the second multiplexing and demultiplexing unit;
   the second multiplexing and demultiplexing unit comprises:

a sixth common port, configured to output the uplink signal multiplexed by the second multiplexing and demultiplexing unit, and receive the downlink signal multiplexed and output by the first multiplexing and demultiplexing unit; and the fifth common port and the sixth common port are connected by using a single fiber.

9. The system according to claim 8, wherein:

the first multiplexing and demultiplexing unit further comprises:
  a fifth branch port, correspondingly connected to the first colorless optical module in a one-to-one manner, and configured to transmit the downlink signal generated by the first colorless optical module to the first multiplexing and demultiplexing unit, and transmit the unlink signal demultiplexed by the first multiplexing and demultiplexing unit to the corresponding first colorless optical module; and the second multiplexing and demultiplexing unit further comprises:
  a sixth branch port, which is correspondingly connected to the second colorless optical module in a one-to-one manner, and configured to transmit the uplink signal generated by the second colorless optical module to the second multiplexing and demultiplexing unit, and transmit the downlink signal demultiplexed by the second multiplexing and demultiplexing unit to the corresponding second colorless optical module.

10. The system according to claim 9, wherein:

a third wavelength division multiplexer is disposed in the first colorless optical module, one end of the third wavelength division multiplexer is connected to the corresponding fifth branch port, and the other end is connected to a signal transmitter and a signal receiver in the first colorless optical module; and a fourth wavelength division multiplexer is disposed in the second colorless optical module, one end of the fourth wavelength division multiplexer is connected to the corresponding sixth branch port, and the other end is connected to a signal transmitter and a signal receiver in the second colorless optical module.

11. A distributed base station signal transmission system, comprising:

a base band unit;

a remote radio unit;

a first multiplexing and demultiplexing unit, configured to multiplex a downlink signal emitted by the base band unit and output the downlink signal to the remote radio unit, and demultiplex an uplink signal sent by the remote radio unit and output the uplink signal to the base band unit;

a second multiplexing and demultiplexing unit, configured to multiplex an uplink signal emitted by the remote radio unit and output the uplink signal to the base band unit, and demultiplex a downlink signal sent by the base band unit and output the downlink signal to the remote radio unit;

a first colorless optical module, configured to receive and parse the uplink signal demultiplexed and output by the first multiplexing and demultiplexing unit and output the uplink signal to the base band unit, and generate, under modulation of the base band unit, the downlink signal and output the downlink signal to the first multiplexing and demultiplexing unit;

a second colorless optical module, configured to receive and parse the downlink signal demultiplexed and output by the second multiplexing and demultiplexing unit and output the downlink signal to the remote radio unit, and generate, under modulation of the remote radio unit, the uplink signal and output the uplink signal to the second multiplexing and demultiplexing unit;

a first partial reflector, configured to perform partial reflection on the downlink signal multiplexed and output by the first multiplexing and demultiplexing unit, so as to form a reverse self-injected optical signal to inject into the first colorless optical module for generating a downlink signal again; and a second partial reflector, configured to perform partial reflection on the uplink signal multiplexed and output by the second multiplexing and demultiplexing unit, so as to form a reverse self-injected optical signal to inject into the second colorless optical module for generating an uplink signal again.

12. The system according to claim 11, wherein:

the first multiplexing and demultiplexing unit comprises:
  a first common port, configured to output the downlink signal multiplexed by the first multiplexing and demultiplexing unit, and
  a second common port, configured to receive the uplink signal multiplexed and output by the second multiplexing and demultiplexing unit; and the second multiplexing and demultiplexing unit comprises:
  a third common port, configured to output the uplink signal multiplexed by the second multiplexing and demultiplexing unit, and
  a fourth common port, configured to receive the downlink signal multiplexed and output by the first multiplexing and demultiplexing unit.

13. The system according to claim 12, wherein the first partial reflector is disposed on an output path of the first common port, and the second partial reflector is disposed on an output path of the third common port.

14. The system according to claim 12, wherein:

the first multiplexing and demultiplexing unit further comprises:
  a first branch port, correspondingly connected to the first colorless optical module in a one-to-one manner, and configured to transmit the downlink signal generated by the first colorless optical module to the first multiplexing and demultiplexing unit, and
  a second branch port, correspondingly connected to the first colorless optical module in a one-to-one manner, and configured to transmit the uplink signal demultiplexed by the first multiplexing and demultiplexing unit to the corresponding first colorless optical module; and the second multiplexing and demultiplexing unit further comprises:
  a third branch port, correspondingly connected to the second colorless optical module in a one-to-one manner, and configured to transmit the uplink signal generated by the second colorless optical module to the second multiplexing and demultiplexing unit, and
  a fourth branch port, which is correspondingly connected to the second colorless optical module in a one-to-one manner, and configured to transmit the downlink signal demultiplexed by the second multiplexing and demultiplexing unit to the corresponding second colorless optical module.

15. The system according to claim 12, wherein:
the first common port and the fourth common port are connected by using a first fiber; and
the second common port and the third common port are connected by using a second fiber.

16. The system according to claim 12, wherein:
both the first common port and the second common port are connected to a first wavelength division multiplexer;
both the third common port and the fourth common port are connected to a second wavelength division multiplexer; and
the first wavelength division multiplexer and the second wavelength division multiplexer are connected by using a single fiber.

17. The system according to claim 11, wherein:
the first multiplexing and demultiplexing unit comprises:
    a fifth common port, configured to output the downlink signal multiplexed by the first multiplexing and demultiplexing unit, and receive the uplink signal multiplexed and output by the second multiplexing and demultiplexing unit;
the second multiplexing and demultiplexing unit comprises:
    a sixth common port, configured to output the uplink signal multiplexed by the second multiplexing and demultiplexing unit, and receive the downlink signal multiplexed and output by the first multiplexing and demultiplexing unit; and
the fifth common port and the sixth common port are connected by using a single fiber.

18. The system according to claim 17, wherein:
the first multiplexing and demultiplexing unit further comprises:
    a fifth branch port, correspondingly connected to the first colorless optical module in a one-to-one manner, and configured to transmit the downlink signal generated by the first colorless optical module to the first multiplexing and demultiplexing unit, and transmit the unlink signal demultiplexed by the first multiplexing and demultiplexing unit to the corresponding first colorless optical module; and
the second multiplexing and demultiplexing unit further comprises:
    a sixth branch port, correspondingly connected to the second colorless optical module in a one-to-one manner, and configured to transmit the uplink signal generated by the second colorless optical module to the second multiplexing and demultiplexing unit, and transmit the downlink signal demultiplexed by the second multiplexing and demultiplexing unit to the corresponding second colorless optical module.

19. The system according to claim 18, wherein:
a third wavelength division multiplexer is disposed in the first colorless optical module, one end of the third wavelength division multiplexer is connected to the corresponding fifth branch port, and the other end is connected to a signal transmitter and a signal receiver in the first colorless optical module; and
a fourth wavelength division multiplexer is disposed in the second colorless optical module, one end of the fourth wavelength division multiplexer is connected to the corresponding sixth branch port, and the other end is connected to a signal transmitter and a signal receiver in the second colorless optical module.

20. A communication system, comprising:
a passive optical transmission system comprising,
    a network side optical network unit and a user side optical network unit,
    a first multiplexing and demultiplexing device connected to the network side optical network unit, and
    a second multiplexing and demultiplexing device connected to the user side optical network unit, wherein the first multiplexing and demultiplexing device performs signal transmission with the second multiplexing and demultiplexing device through a fiber; and
a distributed base station signal transmission system comprising,
    a base band unit and a remote radio unit, wherein:
    the distributed base station signal transmission system uses the first multiplexing and demultiplexing device to multiplex a downlink signal emitted by the base band unit and output the downlink signal to the remote radio unit, and demultiplex an uplink signal sent by the remote radio unit and output the uplink signal to the base band unit, and
    the distributed base station signal transmission system uses the second multiplexing and demultiplexing device to multiplex an uplink signal emitted by the remote radio unit and output the uplink signal to the base band unit, and demultiplex a downlink signal sent by the base band unit and output the downlink signal to the remote radio unit,
a first colorless optical module, configured to receive and parse the uplink signal demultiplexed and output by the first multiplexing and demultiplexing device, output the uplink signal to the base band unit, and generate, under modulation of the base band unit, the downlink signal and output the downlink signal to the first multiplexing and demultiplexing device,
a second colorless optical module, configured to receive and parse the downlink signal demultiplexed and output by the second multiplexing and demultiplexing device, output the downlink signal to the remote radio unit, and generate, under modulation of the remote radio unit, the uplink signal and output the uplink signal to the second multiplexing and demultiplexing device,
a first broad-spectrum light source, configured to output a broad-spectrum optical signal to the first multiplexing and demultiplexing device, and provide exciting light for the first colorless optical module, so as to generate the downlink signal, and
a second broad-spectrum light source, configured to output a broad-spectrum optical signal to the second multiplexing and demultiplexing device, and provide exciting light for the second colorless optical module, so as to generate the uplink signal.

* * * * *